H. R. HUGHES.
ROLLER BORING DRILL.
APPLICATION FILED JUNE 20, 1913.

1,130,290.

Patented Mar. 2, 1915.

2 SHEETS—SHEET 1.

Witnesses:
Geo. R. Ladson
C. M. Badger

Inventor,
Howard R. Hughes.
By Bakewell & Church attys.

H. R. HUGHES.
ROLLER BORING DRILL.
APPLICATION FILED JUNE 20, 1913.
1,130,290.
Patented Mar. 2, 1915
2 SHEETS—SHEET 2.
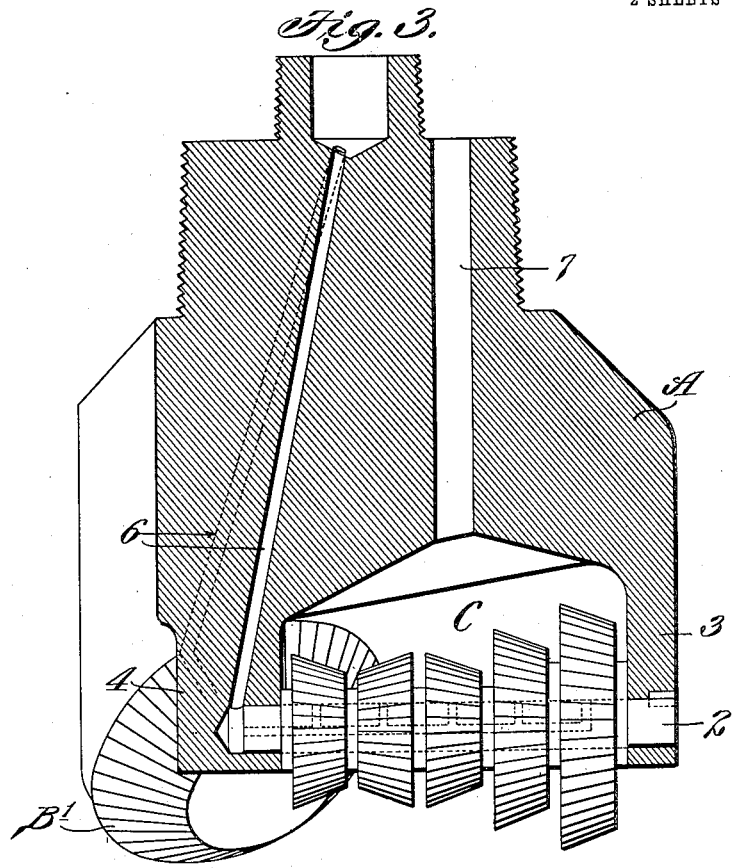
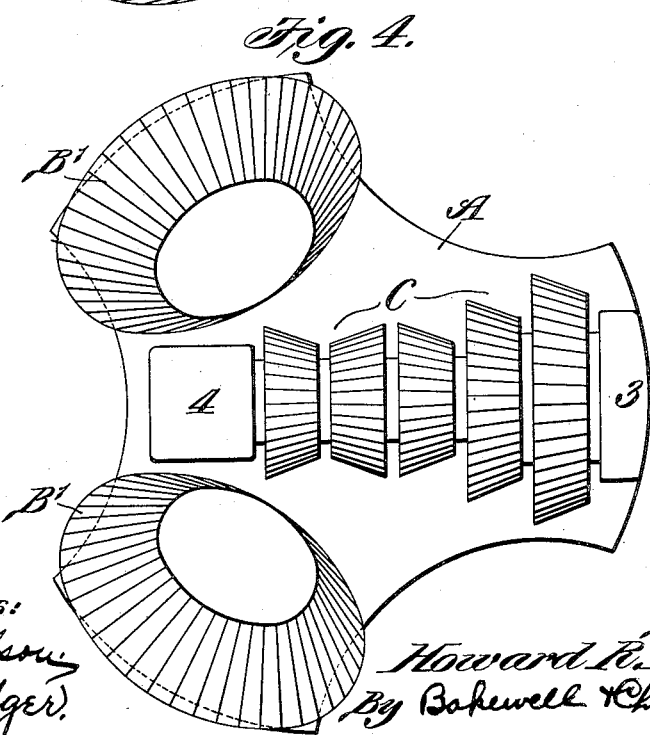
Witnesses:
Geo. P. Kadson
O. M. Badger
Inventor,
Howard R. Hughes.
By Bakewell & Church, attys.

UNITED STATES PATENT OFFICE.

HOWARD R. HUGHES, OF HOUSTON, TEXAS, ASSIGNOR TO SHARP-HUGHES TOOL COMPANY, OF HOUSTON, TEXAS, A CORPORATION OF TEXAS.

ROLLER BORING-DRILL.

1,130,290.          Specification of Letters Patent.          Patented Mar. 2, 1915.

Application filed June 20, 1913. Serial No. 774,775.

*To all whom it may concern:*

Be it known that I, HOWARD R. HUGHES, a citizen of the United States, residing at Houston, Texas, have invented a certain new and useful Improvement in Roller Boring-Drills, of which the following is a full, clear, and exact description, such as will enable others skilled in the art to which it appertains to make and use the same.

This invention relates to roller boring drills, and has for its main object to provide an inexpensive and serviceable drill in which the cutting rollers are arranged on the head in a novel manner.

Another object is to provide a roller boring drill in which the cutting rollers are so arranged that the drill will remain centered in the hole and will not wabble sidewise when the drill is in operation.

Other objects and desirable features of my invention will be hereinafter pointed out.

Figure 1:
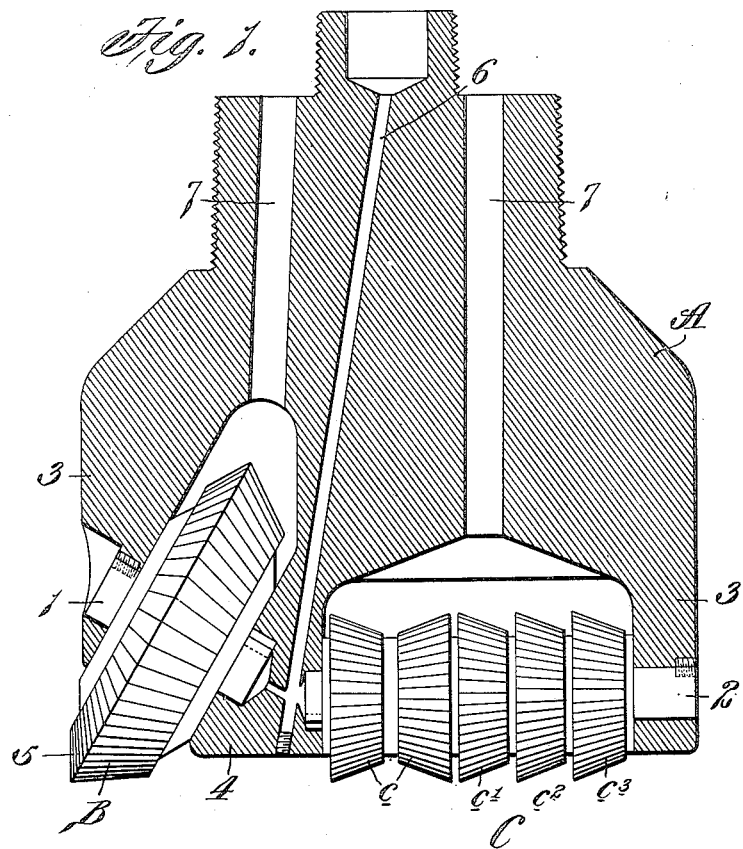
Figure 2:
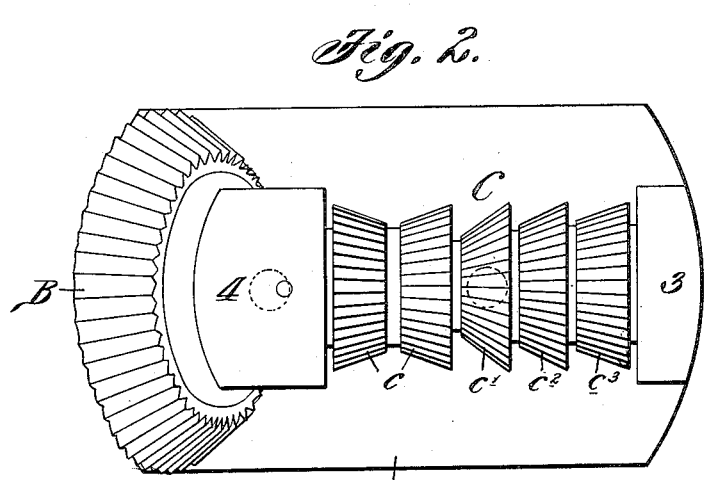

Figure 1 of the drawings is a vertical sectional view of a roller boring drill constructed in accordance with my invention; Fig. 2 is a bottom plan view of a drill of the same general design but having some of the rollers arranged in a slightly different manner; Figs. 3 and 4 are a vertical sectional view and a bottom plan view, respectively, illustrating another form of my invention.

Referring to Fig. 1 of the drawings which illustrates one form of my invention, A designates an approximately frusto-conical-shaped cutting roller that is rotatably mounted on a spindle 1 which inclines downwardly and inwardly toward the vertical axis of the head, and C designates a group of comparatively small rollers which are rotatably mounted on a horizontally disposed spindle 2 that extends transversely of the head and which is arranged in the same vertical plane as the spindle 1. The head A is provided with side bearings 3 that support the outer ends of the spindles 1 and 2, and a center bearing 4 is formed on the head at one side of the vertical axis of the head so as to support the inner ends of the spindles 1 and 2, said spindles being secured to said bearings in any suitable manner. The group of small rollers C of the drill shown in Fig. 1 comprises a pair of approximately frusto-conical-shaped rollers $c$ whose small ends are presented toward each other and three rollers $c^1$, $c^2$, and $c^3$ which are approximately frusto-conical-shaped and arranged with their base ends or larger ends presented inwardly or toward the center of the head A. The rollers $c$ are located at the center of the head, and in view of the fact that they form a substantially spool-shaped cutting means they form an approximately conical-shaped projection at the center of the bottom of the hole which tends to keep the drill centered in the hole. The roller B is provided at its outer end with cutting teeth 5 that remove the material from the side of the hole and thus forms sufficient clearance for the drill head to prevent the drill from sticking in the hole. The action of the roller B on the side of the hole tends to cause the head A to move transversely, but this lateral side thrust of the head is overcome by the oppositely arranged frusto-conical-shaped rollers $c^1$, $c^2$, and $c^3$ which are so mounted that they tend to force the head A transversely in the opposite direction. A lubricating duct 6 in the head that leads from the lubricant-holder to the spindles 1 and 2 supplies a lubricating medium to the bearing surfaces on which the rollers of the drill turn, and water-holes 7 are formed in the head so as to discharge jets of water onto the roller B and onto the group of small rollers C so as to flush out the disintegrated material.

The drill shown in Fig. 2 is of the same general design as the drill shown in Fig. 1 but the small frusto-conical-shaped rollers $c^1$, $c^2$, and $c^3$ are arranged with their base ends or large ends presented outwardly.

In Figs. 3 and 4 I have shown a drill of similar design to the drill shown in Fig. 1 except that it comprises a group of small rollers C and two large approximately frusto-conical-shaped rollers $B^1$ that aid in maintaining the clearance for the head and also tend to center the drill in the hole. The group of small rollers C are rotatably mounted on a horizontally-disposed spindle 2 that extends transversely of the head A of the drill and which is securely supported at its opposite ends in integral bearings 3 and 4 on the head. The rollers $B^1$ are arranged on opposite sides of the axis of rotation of the group of rollers C adjacent the bearing 4 which supports the inner end of the spindle 2, and both of said rollers $B^1$ are preferably mounted in such a manner that their vertices lie in the vertical axis of the head A of the drill.

I have not illustrated the spindles which support the rollers B¹ or the means for holding the rollers on their spindles, as it is immaterial so far as my present invention is concerned how the rollers B¹ are secured to the head.

A roller boring drill of the construction above-described is inexpensive to manufacture, it is strong and serviceable, and it will remain centered in the hole when the drill is in operation.

Having thus described my invention, what I claim as new and desire to secure by Letters Patent is:

1. A roller boring drill comprising a head provided with a transversely disposed spindle that is equipped with a pair of oppositely tapered centering cutters arranged one at each side of the vertical axis of the head and also having a plurality of tapered cutters arranged at one side of said centering cutters with their large ends presented inwardly toward the vertical axis of the head, and an inwardly inclined frusto-conical-shaped cutting roller on said head that maintains the clearance for the head.

2. A roller boring drill comprising a head provided with a horizontally disposed spindle that extends transversely of the head from one side of same to a point beyond the vertical axis of the head, a group of cutting rollers on said spindle, and a plurality of approximately frusto-conical-shaped cutting rollers on said head arranged adjacent the inner end of said spindle on opposite sides of same and having their axes of rotation inclined downwardly and inwardly toward the vertical axis of the head.

3. A roller boring drill comprising a head, a horizontally disposed spool-shaped cutting means rotatably mounted on said head in longitudinal alinement with the vertical axis of the head, an inwardly inclined frusto-conical shaped cutter on said head provided at its base end with a cutting surface that acts on the side wall of the hole, and a plurality of rotatable tapered cutters extending transversely of the head in longitudinal alinement with said spool-shaped cutting means and arranged with their large ends presented inwardly toward the vertical axis of the head.

In testimony whereof I hereunto affix my signature in the presence of two witnesses, this eleventh day of June 1913.

HOWARD R. HUGHES.

Witnesses:
   HYMAN LEVIN,
   EARL LEIB.